United States Patent [19]
Monti et al.

[11] 3,985,956
[45] Oct. 12, 1976

[54] METHOD OF AND MEANS FOR DETECTING VOICE FREQUENCIES IN TELEPHONE SYSTEM

[75] Inventors: Giancarlo Monti, Milan; Isidoro Poretti, Castiglione Olona, both of Italy

[73] Assignee: Societa Italiana Telecomunicazioni Siemens S.p.A., Milan, Italy

[22] Filed: Apr. 23, 1975

[21] Appl. No.: 570,581

[30] Foreign Application Priority Data
Apr. 24, 1974  Italy.................................. 21869/74

[52] U.S. Cl.............................. 179/1.5 A; 179/15 AS
[51] Int. Cl.²........................................... G10L 1/02
[58] Field of Search......... 179/15 BA, 15 AS, 1 VC, 179/1.5 A, 18 BC, 1 CN, 1.5 B, 1.5 C

[56] References Cited
UNITED STATES PATENTS

| 3,513,260 | 5/1970 | Hellwarth | 179/1.5 C |
| 3,573,612 | 4/1971 | Scarr | 179/1.5 C |
| 3,712,959 | 1/1973 | Fariello | 179/15 AS |
| 3,878,337 | 4/1975 | Fariello | 179/1 VC |

*Primary Examiner*—David L. Stewart
*Attorney, Agent, or Firm*—Karl F. Ross; Herbert Dubno

[57] ABSTRACT

In order to detect the presence of voice frequencies on a telephone line which is periodically sampled for monitoring its activity, with conversion of resulting analog samples into binary words each including a polarity bit, the polarity bits of successive samples of a given line are fed to a zero-crossing detector emitting a pulse on every polarity reversal. The pulses pass through a shift register, which is stepped at the sampling rate, into a counter whose count is periodically read to determine whether a line-signal frequency, as represented by the number of zero crossings per test interval, or the rate of change of that frequency exceeds a certain threshold to indicate a fricative or sibilant sound introducing a spoken syllable.

6 Claims, 6 Drawing Figures

METHOD OF AND MEANS FOR DETECTING VOICE FREQUENCIES IN TELEPHONE SYSTEM

FIELD OF THE INVENTION

Our present invention relates to a method of checking the activity of a voice-communication line, i.e. of ascertaining the presence or absence of voice frequencies on that line, as well as to a system for carrying out this method.

BACKGROUND OF THE INVENTION

In commonly owned U.S. Pat. No. 3,760,106, for example, there has been disclosed a PCM telecommunication system including a memory for the storage of an activity pattern from a multiplicity of associated lines, this pattern being periodically updated with the aid of respective monitoring units for the control of a gate which blocks communication between a multiplexer and a line found to be inactive. In the conventional sampling of telephone and other voice-communication lines, activity is generally determined from the existence of a certain minimum voltage level persisting for a number of sampling cycles. These signal characteristics are ascertained with the aid of threshold and integrating circuits responding, for example, to a signal level of −40 dBm. Thus, the system discriminates against transients and low-level background noise.

Such a high degree of selectivity, however, tends to suppress voice signals of relatively low energy content which nevertheless are significant elements of human speech, such as fricative or sibilant sounds introducing a syllable of a spoken word. Failure to recognize these sounds as useful signals results in a loss of information or a distortion of meaning, as when an initial "s" is lost to make "sour" sound like "our". This drawback cannot be eliminated in conventional systems by a lowering of the sensitivity threshold since that would also increase the noise level.

OBJECTS OF THE INVENTION

The general object of our present invention, therefore, is to provide an improved method of monitoring the activity of telephone or other voice-communication lines, subject to periodic sampling, which obviates the aforestated drawbacks and enables the recognition of voiced or unvoiced consonants, especially those introducing a spoken syllable, to the exclusion of spurious transients and noises.

A related object is to provide, in a PCM telephone or other voice-communication system, means for detecting such sounds with maintenance of a high signal-to-noise ratio in the output of the detector circuit.

SUMMARY OF THE INVENTION

We have found, in accordance with our present invention, that the constituents of human speech — such as the aforementioned fricative and sibilant consonants — have characteristic frequencies whose magnitude and/or rate of change, within an interval on the order of tens of milliseconds, distinguishes them from the usual line noise whose frequency spectrum remains substantially invariant during that interval.

Thus, in accordance with one aspect of our present invention, a line to be monitored for its activity is sampled with conversion of each analog line-voltage sample into a binary word including a polarity bit as is well known per se. By a comparison of successive bits from the sampled line with one another, zero crossings of the line voltage are ascertained from a changeover in the binary value from one bit to the next. By counting the number of such changeovers within a predetermined test interval substantially longer than a sampling period, that number being a measure of the instantaneous signal frequency, we can derive from the count of zero crossings a numerical value indicative of the character of a line signal. A comparison of this numerical value with a predetermined threshold, therefore, reveals whether the signal has the characteristic of a constituent of a spoken syllable.

This numerical value may be a direct measure of frequency, such as the reading of a counter adapted to register the number of zero crossings, or a voltage constituting the analog equivalent of that count; in a more elaborate system determining the rate of frequency change as a characteristic parameter, the differential of this analog voltage may be compared with a predetermined reference value.

According to another aspect of our invention, therefore, we provide a zero-crossing detector connected to an analog/digital converter in a line-sampling circuit to receive successive polarity bits therefrom, this detector emitting a counting pulse in response to any changeover in the binary value of the oncoming polarity bits. The number of counting pulses registered during each test interval, as determined by associated timing means, is read out into an evaluation circuit which determines from the count the existence of a line signal that is characteristic of a constituent of a spoken syllable.

According to a more particular feature of our invention, the evaluation circuit works into a coincidence (AND or NAND) gate having another input connected to a conventional level detector in order to generate an output signal upon the simultaneous presence of a characteristic line signal and a line-voltage level exceeding a certain threshold. For the reasons indicated above, that threshold will generally be substantially lower than in conventional activity-monitoring systems; such a lowering of the minimum line voltage, however, will not give passage to spurious signals in view of the selectivity of the zero-crossing detector and associated circuitry.

BRIEF DESCRIPTION OF THE DRAWING

The above and other features of our invention will now be described in detail with reference to the accompanying drawing in which.

SPECIFIC DESCRIPTION

Figure 1:
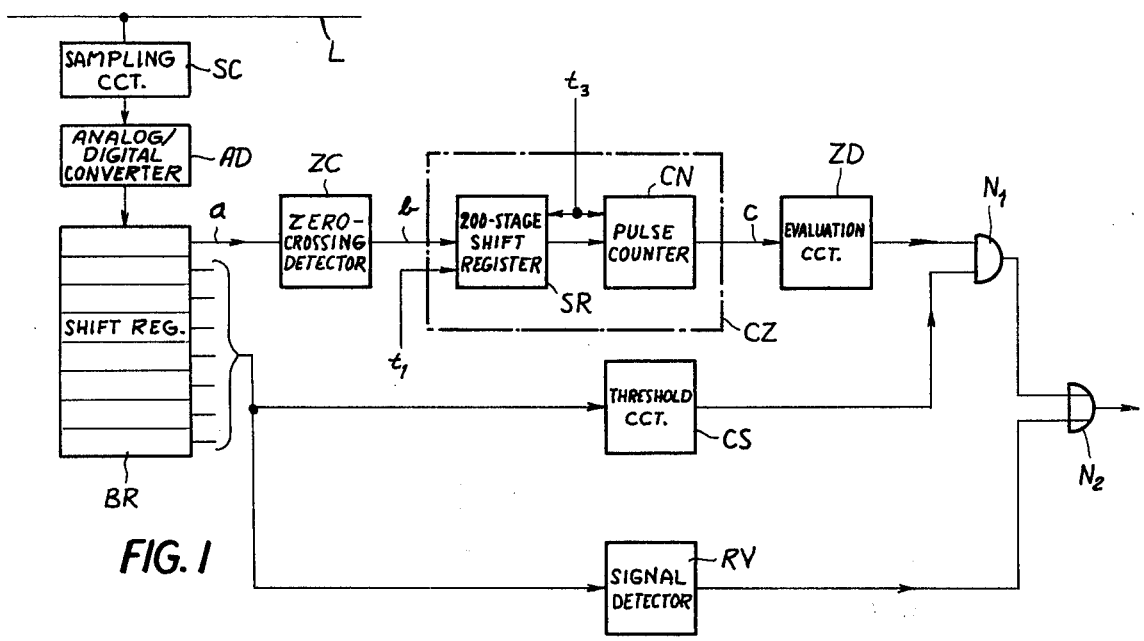
FIG. 1 is a block diagram of a line-monitoring system according to our invention.

In FIG. 1 we have shown a conventional sampling circuit SC periodically testing the voltage level on a telephone line L forming part of a group of such lines not further illustrated. Sampler SC works into an analog/digital converter AD deriving from each voltage sample a combination of bits which are fed to a shift register BR for parallel readout. The highest-ranking bit, indicative of the polarity of the voltage sample, is read out over a lead $a$ to a zero-crossing detector ZC more fully illustrated in FIG. 2. In response to any change in the logical value of successive polarity bits, i.e. a transition from "1" to "0" or vice versa, detector ZC emits a pulse on a lead $b$ to load a shift register SR here assumed to be capable of storing 200 bits in as many stages. Register SR, which is stepped by clock pulses $t_1$ from a nonillustrated time base, serially discharges the stored bits into a pulse counter CN; the units SR and CN form part of a discriminating circuit CZ which is periodically cleared by a timing pulse $t_3$.

In the embodiment herein discussed, it is assumed that clock pulses $t_1$ recur with a cadence of 8 KHz, corresponding to the sampling frequency, so as to load the shift register SR in the course of a test interval of 25 ms; thus, timing pulse $t_3$ has a repetition frequency of 40 Hz. This timing pulse reads out the contents of counter CN, over a lead $c$, to an evaluation circuit ZD working into one input of an AND gate $N_1$; the other input of this gate is connected to the output of a conventional threshold circuit CS, serving as a level detector, with input connections to all the stages of register BR other than the one carrying the polarity bit. The threshold of circuit CS may be as low as −50 dBm, for example.

A signal detector RV, connected in parallel with threshold circuit CS, gives passage to signals such as ringing currents within a relatively narrow frequency range of the voice band; the outputs of AND gate $N_1$ and signal detector RV are connected to respective inputs of an OR gate $N_2$ which controls a load such as a gating circuit of the type described in the aforementioned U.S. Pat. No. 3,760,106.

Figure 2:
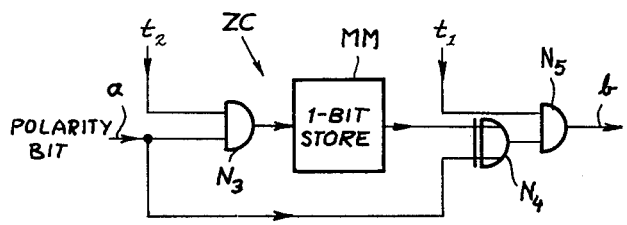
FIG. 2 shows details of a zero-crossing detector included in the system of FIG. 1.
Figure 3:
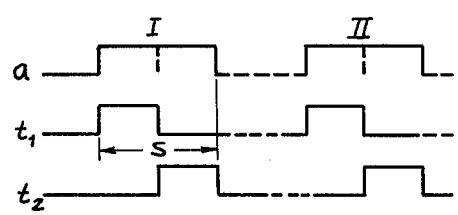
FIG. 3 is a set of graphs relating to the operation of the detector of FIG. 2.

FIG. 2 shows zero-crossing detector ZC as comprising an AND gate $N_3$ receiving the polarity bits on input lead $a$ and further receiving clock pulses $t_2$ which are delayed by half a time slot $s$ with reference to pulses $t_1$ as illustrated in FIG. 3. The polarity bit on lead $a$ passes, in the presence of pulse $t_2$ during the second half of a time slot, into a one-bit store MM. The contents of this store are read out, one sampling period later, into an Exclusive-OR gate $N_4$ also receiving directly the polarity bit of the next sampling cycle from lead $a$; thus, a change in polarity between sampling at instants I and II renders the gate $N_4$ conductive so that a counting pulse appears on the output lead $b$ of another AND gate $N_5$ in cascade therewith whenever the latter gate is unblocked by a clock pulse $t_1$ in the first half of a time slot $s$.

Figure 4:
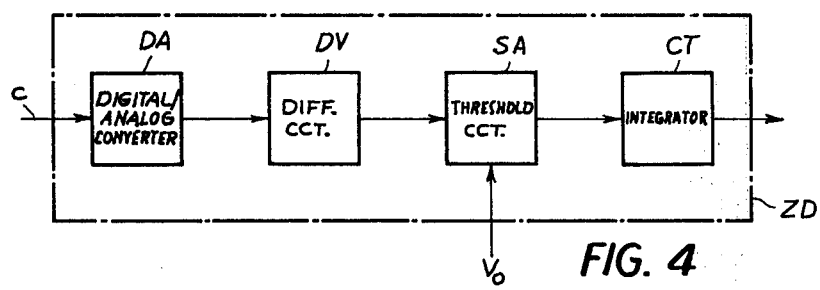
FIG. 4 shows details of an evaluation circuit included in the system of FIG. 1.

As shown in FIG. 4, evaluation circuit ZD comprises a digital/analog converter DA receiving the pulse count on lead $c$ and feeding an analog voltage into a differentiation circuit DV whose output is proportional to the rate of change of that analog voltage from one sampling cycle to another, i.e. at intervals of 125 $\mu$s. A threshold circuit SA, receiving a reference voltage $V_0$, compares the output voltage of differentiation circuit DV with that reference voltage and feeds an output pulse to an integrator CT when the comparison is positive. Integrator CT may have a time constant on the order of 150 ms designed to compensate for the delay inherent in the operation of threshold circuit CS, in order to insure simultaneous availability of their respective output signals at gate $N_1$.

Figure 5:
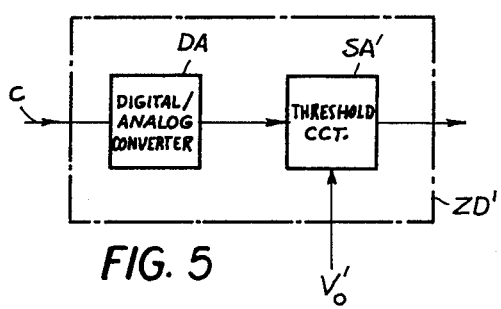
FIGS. 5 and 6 show respective modifications of the evaluation circuit illustrated in FIG. 4.

In FIG. 5 we have shown an evaluation circuit ZD' in which units DV, SA and CT of FIG. 4 have been replaced by a threshold circuit SA' receiving a reference voltage $V'_0$ to compare the absolute value of the analog output or converter DA with that threshold.

Figure 6:
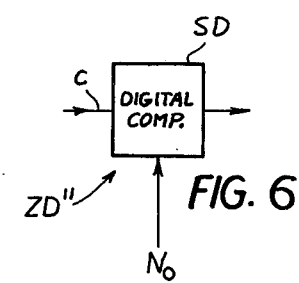

FIG. 6, finally, shows a simplified evaluation circuit ZD" consisting of a digital comparator SD which receives a numerical reference value $N_0$ for comparison with the reading of counter CN.

Storage means as shown at CT in FIG. 4 may, of course, also be connected in cascade with units SA' and SD of FIGS. 5 and 6.

We claim:
1. A method of monitoring the activity of a periodically sampled voice-communication line with conversion of each analog line-voltage sample into a binary word including a polarity bit, comprising the steps of comparing successive polarity bits from the sampled line with one another, counting the number of changeovers in the binary value of said successive polarity bits within a predetermined test interval substantially longer than a sampling period, deriving from the rate of change of said number of changeovers, counted in successive test intervals, a numerical value indicative of the character of a signal on said line, and comparing said numerical value with a predetermined threshold to ascertain whether said signal has the characteristic of a constituent of a spoken syllable.

2. In a system for monitoring the activity of a voice-communication line, including sampling means for periodically ascertaining the presence of line voltage and conversion means for translating an analog value of such a line voltage into a binary word including a polarity bit, the combination therewith of a zero-crossing detector connected to said conversion means for receiving successive polarity bits therefrom and emitting a pulse in response to any changeover in the binary value of said bits, counting means connected to said detector for receiving said pulses therefrom and registering their count during successive test intervals of predetermined duration substantially exceeding a sampling period, timing means connected to said counting means for clearing same at the end of each test interval, and evaluation means connected to said counting means for determining from said count the existence of a line signal which is characteristic of a constituent of a spoken syllable; said evaluation means including a threshold circuit, a digital analog converter between said counting means and said threshold circuit, and differentiation means inserted between said converter and said threshold circuit.

3. The combination defined in claim 2, further comprising level-detecting means connected to said conversion means and coincidence means with input connections to said evaluation means to said level-detecting means for generating an output signal upon simultaneous presence of said characteristic line signal and a line-voltage level exceeding a predetermined limit.

4. The combination defined in claim 2, further comprising integrating means connected to said threshold circuit for lengthening a comparison signal emitted by the latter.

5. The combination defined in claim 2 wherein said detector comprises one-bit delay means provided with an input lead for said polarity bits and with an output lead for delayed bits, and anticoincidence means connected to both said leads.

6. The combination defined in claim 2, further comprising a multistage shift register inserted between said detector and said counting means with a storage capacity for all the polarity bits received during a test interval.

* * * * *